United States Patent [19]
Haruta et al.

[11] Patent Number: 5,207,808
[45] Date of Patent: May 4, 1993

[54] CANISTER FOR ADSORBING EVAPORATED FUEL

[75] Inventors: Kazumi Haruta, Obu; Hideo Yamada; Kenji Koeda, both of Nagoya, all of Japan

[73] Assignee: Aisan Kogyo Kabushiki Kaisha, Ohbu, Japan

[21] Appl. No.: 924,962

[22] Filed: Aug. 5, 1992

[30] Foreign Application Priority Data

Sep. 10, 1991 [JP] Japan .................. 3-229895

[51] Int. Cl.⁵ .............................. B01D 50/00
[52] U.S. Cl. ............................ 55/316; 55/387; 123/519
[58] Field of Search ............ 55/387, 316; 123/519

[56] References Cited
U.S. PATENT DOCUMENTS 4,448,594  5/1984  Kozawa ......................... 55/387
4,684,382  8/1987  Abu-Isa ......................... 55/387

Primary Examiner—Bernard Nozick
Attorney, Agent, or Firm—Cushman, Darby & Cushman

[57] ABSTRACT

A canister for adsorption of evaporated fuel in an automobile. The canister operates to decrease leakage of the evaporated fuel when the atmosphere temperature rises or the canister is left as it is for a long time. To this end, the canister according to the invention comprises a first container provided in adjacent to an inlet for evaporated fuel and incorporating therein a liquid-phase component adsorbent, a second container provided on the downstream of the first container and on the side or the top of the first container and filled with an adsorbent, and a third container disposed between the second container and an atmosphere port and filled with an adsorbent. Further, the first, second and third container are integrally formed. With such structure, liquid-phase components of the evaporated fuel are collected by the adsorbent in the first container so that a life span of the adsorbent in the second container can be elongated. Further, since the third container is filled with the adsorbent, the evaporated fuel forcibly discharged from the adsorbent of the second container is collected by the adsorbent in the third container when the atmosphere temperature rises or the canister is left for a long time. Therefore, the evaporated fuel can be prevented from being discharged into the atmosphere.

9 Claims, 3 Drawing Sheets

CANISTER FOR ADSORBING EVAPORATED FUEL

BACKGROUND OF THE INVENTION

1. Industrial Field of the Invention

The present invention relates to a canister for adsorption of evaporated fuel in an automobile.

2. Description of the Related Art

Conventionally, a canister serves to adsorb fuel vapor which is evaporated in a fuel tank when an engine of an automobile is stopped or when a vehicle is running, by activated carbon contained in the canister so as to supply the adsorbed evaporated fuel to the engine during operation of the engine. The canister includes an adsorption port communicating with a fuel tank, which adsorption port is provided on the upper or lower side of the canister main body containing the activated carbon therein. The canister also includes a purge port communicating with an intake manifold and an atmosphere port in communication with an atmosphere on the lower or upper side of the canister.

In the above-described prior art, high boiling components in the evaporated fuel are adsorbed by the activated carbon and accumulated in the canister, so that deterioration of the activated carbon is accelerated. Thus, the conventional canister has such a disadvantage that the adsorbing capability of the canister is lowered when it is used for a long time.

The fuel vapor is diffused in the container of the canister when the canister is left as it is for a long time. The diffused fuel vapor is forcibly discharged by the fuel vapor which has newly come into the canister. Also, when the temperature of the atmosphere surrounding the canister rises, the evaporated fuel vapor expands. Accordingly, even if the canister has adsorbed only a small amount of the evaporated fuel, the evaporated fuel unfavorably leaks through the atmosphere port of the canister into the atmosphere when the temperature of the atmosphere rises or when a small amount of the evaporated fuel enters the canister after the canister is left as it is for a long time.

SUMMARY OF THE INVENTION

The present invention aims to provide a canister for adsorption of evaporated fuel which can solve the above-described disadvantage of the prior art.

To achieve the above object, a canister for adsorbing evaporated fuel according to the invention comprises a first container which is provided in adjacent to an inlet for the evaporated fuel and which incorporates therein a liquid-phase component adsorbent made of porous material such as sponge in order to collect liquid-phase components; a second or main container which is provided on the downstream side of the first container as well as on the side or the top of the first container and which is filled with activated carbon; and a third container disposed between the main container and an atmosphere port, which third container being filled with activated carbon. The canister is characterized in that the first container, the main container and the third container are formed integrally with one another.

High boiling components in the evaporated fuel are first liquefied when the evaporated fuel enters the canister of which temperature is lower than that of the evaporated fuel. The liquefied liquid-phase components are adsorbed by the liquid-phase component adsorbent in the first container, thereby being prevented from flowing out of the first container.

The evaporated fuel from which the high boiling components are eliminated flows into the main container and is adsorbed by the activated carbon therein. The evaporated fuel adsorbed by the activated carbon in the main container leaks from the main container because the temperature rises, or the evaporated fuel is forcibly discharged from the main container into the third container due to the evaporated fuel produced because the canister is left as it is for a long time. In the third container, the evaporated fuel is adsorbed by the activated carbon, so that it is prevented from being discharged into the atmosphere.

DETAILED DESCRIPTION OF THE INVENTION

Figure 1:
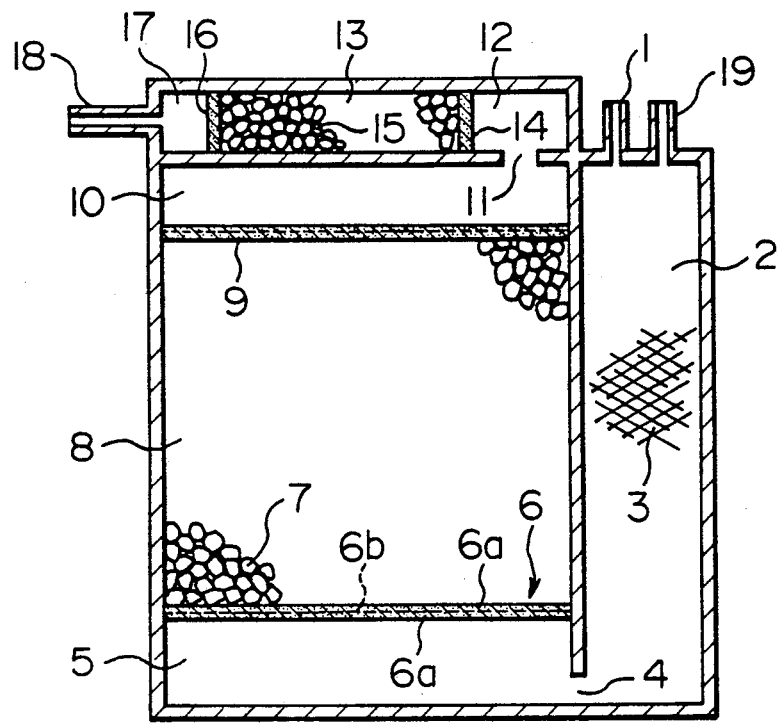
FIG. 1 is a longitudinally sectional view of a canister according to a first embodiment of the invention.

FIG. 1 shows a canister for adsorption of evaporated fuel according to a first embodiment of the invention. In FIG. 1, reference numeral 1 designates a tank port which is an inlet for introducing the evaporated fuel, the tank port being communicated with an upper space in a fuel tank through a conduit (not shown). Reference 2 denotes a first container including the tank port formed at the upper portion. The first container 2 is filled with a liquid-phase component adsorbent 3 made of porous material (such as sponge) which collects and adsorbs liquid-phase components of the evaporated fuel. When the temperature of the canister is lower than that of the evaporated fuel, high boiling components of the evaporated fuel flowing from the tank port 1 into the canister 1, are liquefied. The liquefied high boiling components of the evaporated fuel are collected and adsorbed by the liquid-phase component adsorbent 3, and prevented from flowing out of the first container 2.

Reference numeral 4 indicates a passage formed at a lower portion of the first container 2. The passage 4 leads to a diffusion chamber 5. A main container 8 filled with activated carbon 7 is provided above the diffusion chamber 5. The main chamber 8 includes a separation plate 6 at the bottom. The separation plate 6 comprises two punching metal sheets 6a with a number of pores and a filter 6b sandwiched therebetween. A separation plate 9 provided at the top of the main container 8 also comprises two punching metal sheets and a filter sandwiched therebetween, similarly to the separation plate 6. The separation plates 6 and 9 may be each formed with only the filter without the punching metal sheets.

Reference 10 shows a diffusion chamber provided above the main container 8 via the separation plate 9. Reference 11 is a passage which communicates the diffusion chamber 10 and another diffusion chamber 12 provided above the diffusion chamber 10. A cross-sectional area of the passage 11 is predetermined to be smaller than a lateral cross-sectional area of the diffusion chamber 10, so that the evaporated fuel in the diffusion chamber 10 cannot move into the diffusion chamber 12 smoothly.

Reference 13 is a third container provided in adjacent to the diffusion chamber 12 with a separation plate 14 interposed therebetween. The third container 13 is filled with activated carbon 15. Reference 16 designates a separation plate provided opposite to the above-mentioned separation plate 14. The activated carbon 15 is positioned between the separation plates 14 and 16. Reference 17 designates a diffusion chamber abutting against the third container 13 via the separation plate 16. The diffusion chamber 17 communicates with the atmosphere through an atmosphere port 18.

The separation plates 14 and 16 each have such a structure that a filter is sandwiched between two punching metal sheets, similarly to the separation plate 6.

Reference 19 shows a purge port which is disposed at the top portion of the first container 2 by the side of the tank port 1. The purge port 19 connects with an intake pipe of an engine through a conduit (not shown).

In the canister of the first embodiment, part of the evaporated fuel from the tank port 1 is liquefied to be collected and adsorbed by the liquid-phase component adsorbent 3 in the first container 2. Gas-phase components of the evaporated fuel except the liquid-phase components flow through the passage 4 to diffuse in the diffusion chamber 5, and then they passes through the separation plate 6 to be adsorbed by the layer of the activated carbon 7 in the main container 8. The adsorption phenomenon of the gas-phase components proceeds successively from the lower portion of the activated carbon layer to the upper portion of the layer, or the evaporating layer of the activated carbon gradually shifts from the bottom to the top portion of the layer. When the amount of the evaporated fuel to be adsorbed is small, only the lower portion of the activated carbon layer is used for the adsorption and the upper portion thereof is not used.

When the flowing of the evaporated fuel from the tank port 1 is stopped under such a condition that the activated carbon adsorbs the evaporated fuel only at the lower portion thereof, an adsorption rate at the lower portion of the activated carbon layer is different from that at the upper portion thereof. However, in the case where the activated carbon layer is left as it is, or the temperature of the atmosphere rises, the adsorbed evaporated fuel diffuses in the activated carbon layer so that the adsorption rate is uniformed in the entire activated carbon layer.

Part of the evaporated fuel flows through the diffusion chamber 10, the passage 11 and the diffusion chamber 12 and arrives at the third container 13 in which the evaporated fuel is adsorbed by the activated carbon 15. Since the evaporated fuel is hindered from movement due to a resistance of the passage 11, the adsorption rate of the activated carbon 15 is smaller than that of the activated carbon 7 after the activated carbon is left as it is for a long time.

When the evaporated fuel newly flows from the tank port 1 after leaving the activated carbon layer as it is for a long time, the evaporated fuel in the activated carbon layer of the main container 8 is forcibly discharged into the third container 13. The evaporated fuel is adsorbed by the activated carbon 15 because the activated carbon 15 has a capacity enough large to adsorb the evaporated fuel. The amount of the evaporated fuel discharged from the atmosphere port 18 to the atmosphere is therefore lessened.

During operation of the engine, when a negative pressure of the intake pipe exceeds a certain value, the evaporated fuel is sucked into the intake pipe from the purge port 19 so that the atmosphere enters from the atmosphere port 18 to flow through the third container 13, the passage 11, the main container 8, the passage 4 and the first container 2, thereby the air cleaning them.

Figure 2:
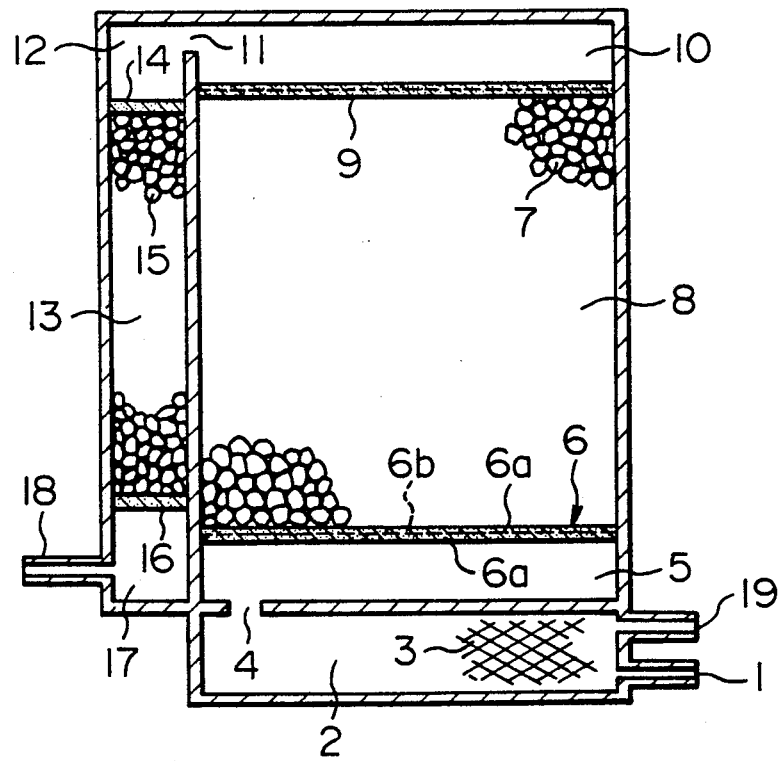
FIG. 2 is a longitudinally sectional view of a canister according to a second embodiment of the invention.

FIG. 2 shows a canister according to a second embodiment of the invention, in which like reference numerals are appended to components having like functions as those of the first embodiment. In the canister of the second embodiment, a first container 2 is provided below a main container 8 and a third container 13 is provided by the side of the main container 8, these containers being formed integrally with one another.

Figure 3:
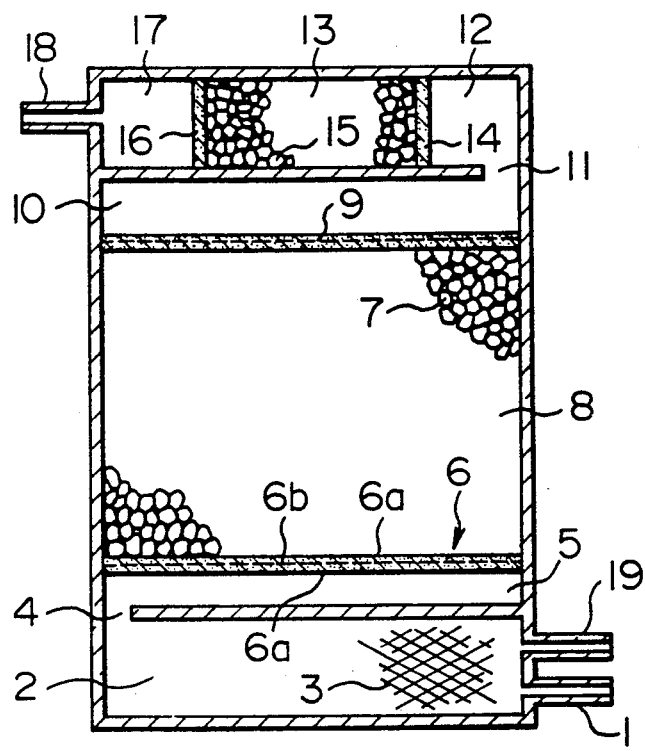
FIG. 3 is a longitudinally sectional view of a canister according to a third embodiment of the invention.
Figure 4:
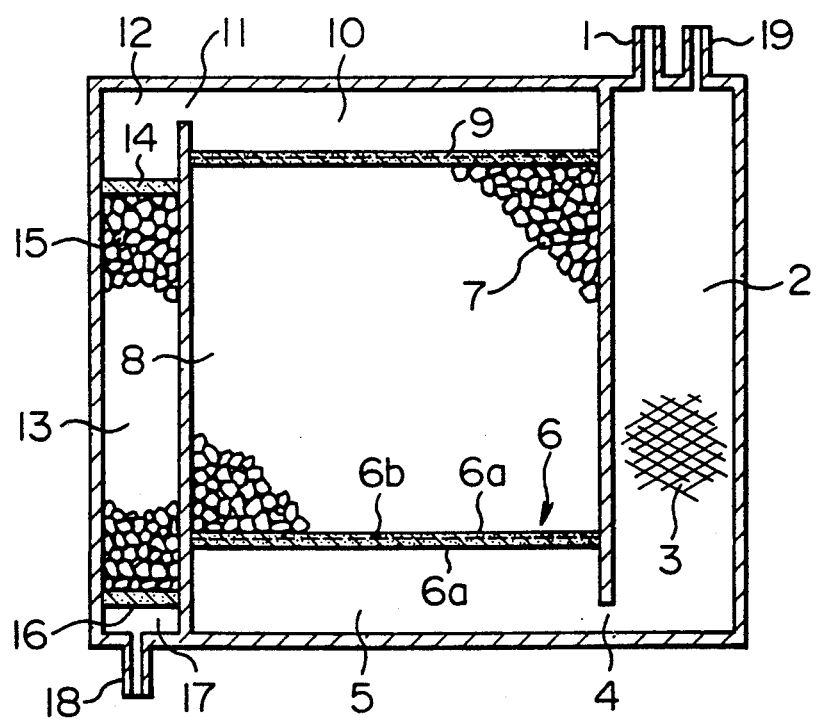
FIG. 4 is a longitudinally sectional view of a canister according to a fourth embodiment of the invention.

FIGS. 3 and 4 illustrate canisters according to third and fourth embodiments of the invention, respectively. In the canisters of the both embodiments, a first container 2 and a third container 13 are attached on opposite sides of a main container 8, respectively.

Figure 5:
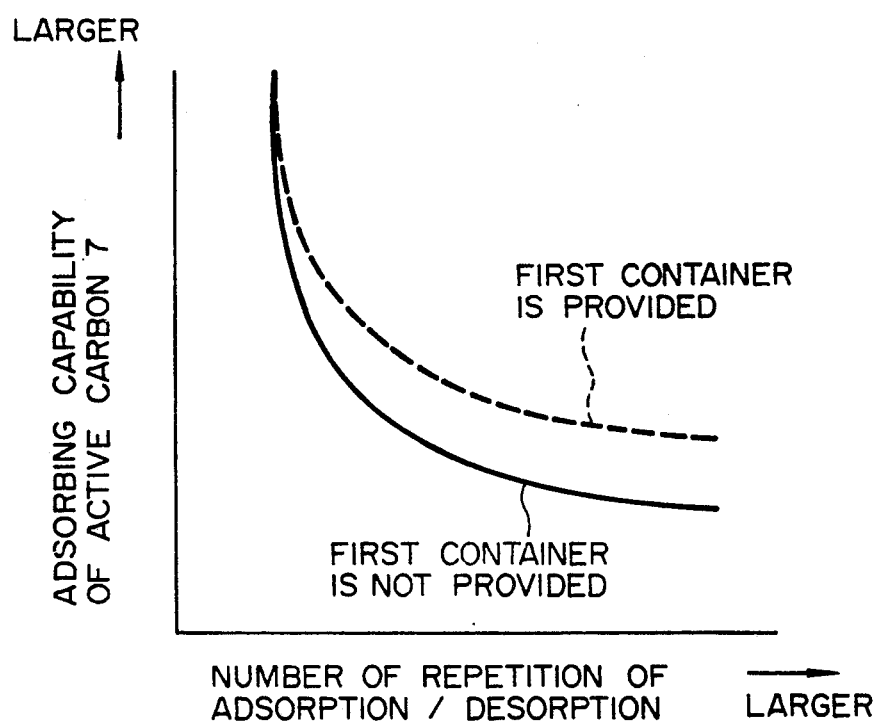
FIG. 5 is a diagram for explanation of an effectiveness of a first container of the canister.

FIG. 5 is a graph showing a difference of the deterioration in adsorbing capability of the activated carbon 7 in the main container between the cases where the first container is provided and where it is not provided. It is understood from this graph that the deterioration of the activated carbon 7 is less when the first container is provided for collecting and adsorbing the liquid-phase components as in this invention.

Figure 6:
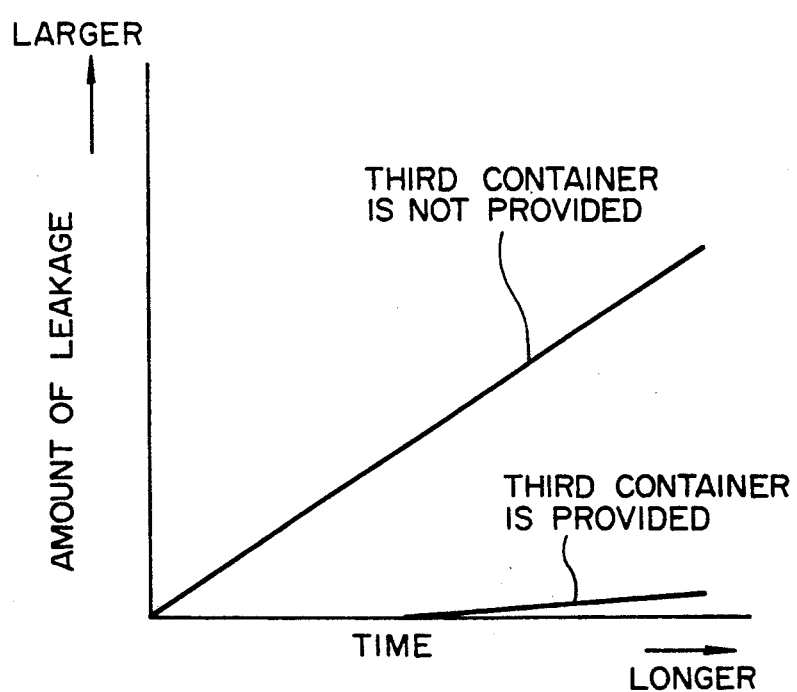
FIG. 6 is a diagram for explanation of an effectiveness of a third container of the canister.

FIG. 6 is a graph indicating a difference in leaking amount of the evaporated fuel into the atmosphere between the cases where the third container is provided and where it is not provided. As clearly found from the graph, the amount of the evaporated fuel leaking into the atmosphere is minimized when the third container is provided as in the invention.

Because the evaporated fuel adsorbing canister according to the invention is constructed in the above-mentioned manner, the high boiling components which particularly affect the deterioration of the activated carbon are collected and adsorbed in the first container so that the flowing of the evaporated fuel into the main container is minimized. Therefore, the high adsorbing capability of the activated carbon is maintained for a long time and a reliability of the canister is improved.

Also, in the invention, the third container provided separately from the main container is filled with the activated carbon. As a result, the evaporated fuel is restrained from being discharged into the atmosphere. The invention satisfies the requirements in a legal control for decreasing an amount of HC leaking from the main body canister, the amount of HC being measured by the DBL (Diurnal Breathing Loss Test) method in the Evaporative Emission Test which will be executed in California of United States from 1995.

Further, the three containers, that is, the first, third and main containers are formed integrally with one another, so that the canister can be miniaturized.

What is claimed is:

1. A canister for adsorbing evaporated fuel comprising a first container which is provided in adjacent to an inlet for evaporated fuel and which incorporates therein a liquid-phase component adsorbent for collecting liquid-phase components in the evaporated fuel, a second container which is provided on a downstream side of said first container and on one of a top and a side of said first container and which is filled with an adsorbent, and a third container disposed between said second container and an atmosphere port and filled with an adsorbent, wherein said first container, said second container and said third container are formed integrally with one another.

2. A canister for adsorbing evaporated fuel according to claim 1, wherein said liquid-phase component adsorbent is made of porous material such as sponge.

3. A canister for adsorbing evaporated fuel according to claim 1, wherein said adsorbents filled in said second and third containers are each activated carbon.

4. A canister for adsorbing evaporated fuel according to claim 1, wherein at least one diffusion chamber is provided between said second and third containers.

5. A canister for adsorbing evaporated fuel according to claim 1, wherein a diffusion chamber is provided between said first and second containers.

6. A canister for adsorbing evaporated fuel according to claim 5, wherein at least one diffusion chamber is provided between said second and third containers.

7. A canister for adsorbing evaporated fuel according to claim 6, wherein two diffusion chambers are provided between said second and third containers, and a cross-sectional area of a passage between said diffusion chambers is smaller than a lateral cross-sectional area of the diffusion chamber on an upstream side of the passage.

8. A canister for adsorbing evaporated fuel according to claim 7, wherein separation plates are provided between the respective containers and the associated diffusion chambers, and said separation plates each comprise two punching metal sheets and a filter sandwiched therebetween.

9. A canister for adsorbing evaporated fuel according to claim 7, wherein separation plates are provided between the respective containers and the associated diffusion chambers, and said separation plates are each formed with a filter.

* * * * *